US005482008A

United States Patent [19]
Stafford et al.

[11] Patent Number: 5,482,008
[45] Date of Patent: Jan. 9, 1996

[54] ELECTRONIC ANIMAL IDENTIFICATION SYSTEM

[76] Inventors: Rodney A. Stafford, Ballyross, Glencree, County Wicklow, Ireland; Michael M. Kilroy, Castlecor, Oldcastle, County Meath, Ireland

[21] Appl. No.: 204,378

[22] PCT Filed: Sep. 11, 1992

[86] PCT No.: PCT/IE92/00009

§ 371 Date: Jun. 22, 1994

§ 102(e) Date: Mar. 11, 1994

[87] PCT Pub. No.: WO93/05648

PCT Pub. Date: Apr. 1, 1993

[30] Foreign Application Priority Data

Sep. 13, 1991 [IE] Ireland .................................. 3238/91
Jan. 6, 1992 [IE] Ireland .................................. 920031
Jan. 28, 1992 [IE] Ireland .................................. 3238/91

[51] Int. Cl.⁶ .................................................. A01K 29/00
[52] U.S. Cl. .......................................... 119/174; 128/899
[58] Field of Search ............................ 119/51.02, 174, 119/215, 859; 128/654, 899; 40/300

[56] References Cited

U.S. PATENT DOCUMENTS

| 4,262,632 | 4/1981 | Hanton et al. | ............................... 119/1 |
| 4,750,490 | 6/1988 | Haw et al. | ........................... 119/215 X |
| 4,992,794 | 2/1991 | Brouwers | ......................... 119/51.02 X |

FOREIGN PATENT DOCUMENTS

| 0299557 | 1/1989 | European Pat. Off. . | |
| 0395188 | 10/1990 | European Pat. Off. . | |
| 2546712 | 12/1984 | France | ...................................... 40/300 |
| 833599 | 5/1983 | South Africa . | |
| 2165723 | 4/1986 | United Kingdom . | |
| 9110982 | 7/1991 | WIPO . | |

*Primary Examiner*—Robert P. Swiatek
*Attorney, Agent, or Firm*—Lorusso & Loud

[57] ABSTRACT

A bolus for administration to a ruminant animal and for retention in the rumen or reticulum of the animal, the bolus having an electronic identification device housed therein with an identification code encoded in the electronic device, and a permanent visual representation of the identification code on and/or within the bolus.

24 Claims, 6 Drawing Sheets

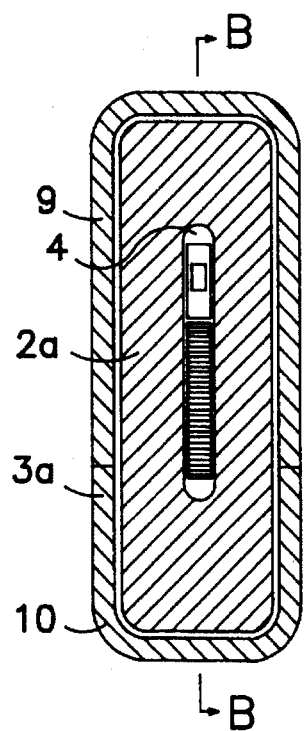
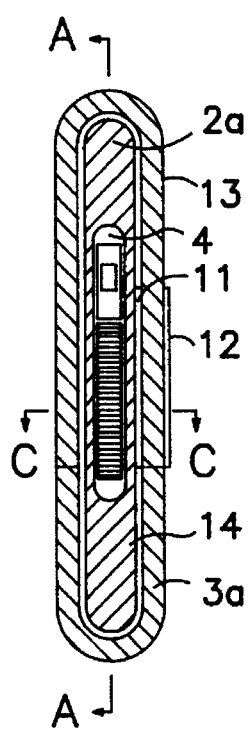
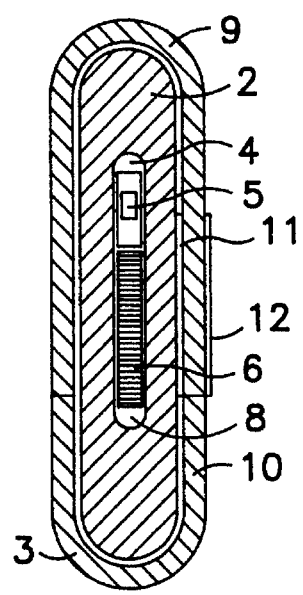
FIG. 7   FIG. 8   FIG. 3
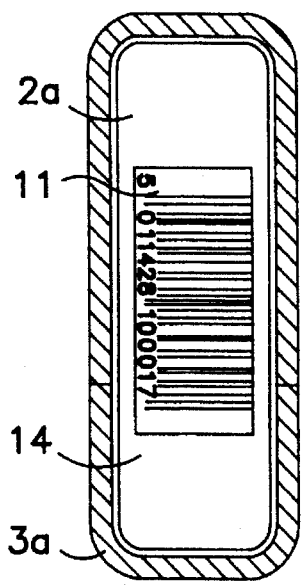
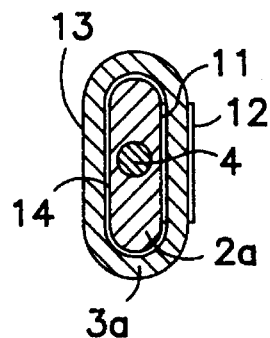
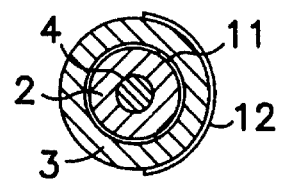
FIG. 10   FIG. 9   FIG. 4

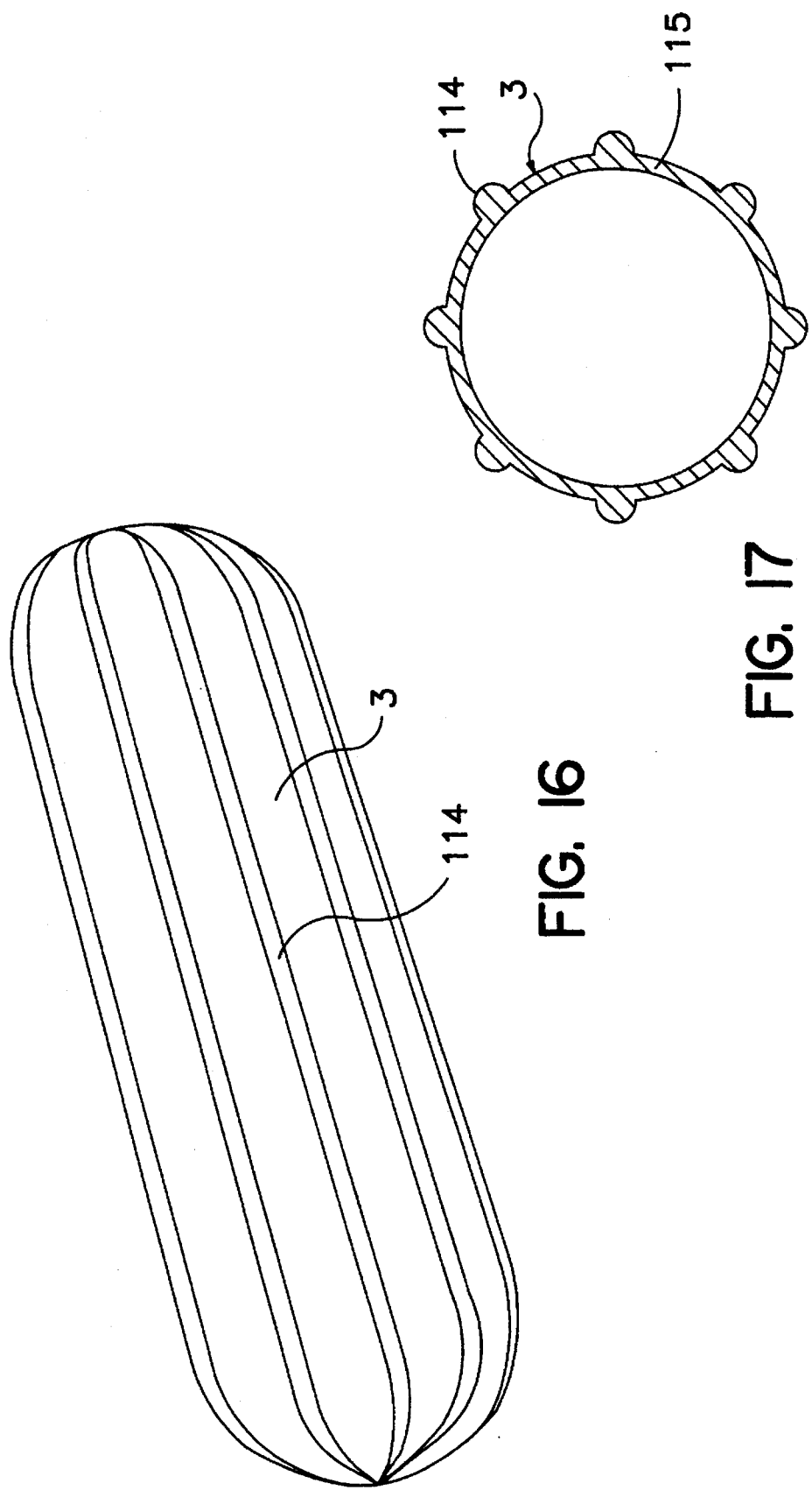

ELECTRONIC ANIMAL IDENTIFICATION SYSTEM

TECHNICAL FIELD

This invention relates to an electronic system for identification of ruminant animals, particularly cattle or sheep.

The importance of introducing a national and international system for animal identification was recognised at a seminar "Automatic Electronic Identification Systems for Farm Animals" held at the Commission of the European Communities, Directorate General for Agriculture, in Brussels on Oct. 17–19, 1990. A report of the seminar published by the EC Commission (EUR-13198-EN) indicates that the European Community is interested in the development of electronic identification systems for use in cross-border trade in farm animals and meat, for control of public health, animal health and welfare, fraud prevention and management systems at farm level.

BACKGROUND ART

It is known to implant a coded transponder in farm animals (see for example EP 0,299,557 NEDAP). A transponder is capable of generating an identification signal, e.g. a code, in response to an electromagnetic interrogation field generated by a transmitter/receiver. However an implanted transponder may migrate in the animal, either as the whole transponder or as fragments thereof resulting from breakage of the transponder. At the time of slaughtering it is desirable that each transponder is accounted for, so that misuse is prevented and the risk of migration or loss is overcome. However it is very difficult to recover all implanted transponders, particularly because of the rapid movement of the animals or their carcases in a slaughter house so that there may be insufficient time to retrieve the transponders. There is a risk that a transponder, or residues thereof, may enter the food chain. Furthermore such a transponder does not provide identification of the animal in situations where the appropriate interrogation unit is not available.

In our International Patent Application WO91/10982 we have described an animal ear tag having a cylindrical transponder in a chamber inside the male part of the tag. An identification index encoded in the transponder is also represented visually on the tag. However ear tags are regarded by some Authorities as less than satisfactory because of a risk of damage or loss from external contact or tampering. While we do not agree with this view, we have now investigated other alternative identification systems.

U.S. Pat. No. 4,262,632 Hanton et. al. describes an electronic identification system for ruminant animals comprising a transmitter capsule precoded to broadcast a series of binary coded electric pulses peculiar to the animal, the transmitter capsule being designed by adjusting its specific gravity to reside permanently in the animal's second stomach or reticulum. The electronics are encapsulated in a housing of a material which can be accepted physiologically by the animal and yet not be attacked by the other contents in the animal's reticulum. The specification indicates that capsules with specific gravities of approximately 1.7 or greater have been successfully retained and that permanent retention is assured with specific gravities of 2 or greater. In the illustrated embodiment, the electronics and a weight are inserted in a glass housing and the capsule is then evacuated and sealed off. Quartz and fiberglass are also mentioned as suitable materials for the housing.

GB 2,165,723A describes an animal identification device comprising a transponder in the form of an electronically coded bolus which fits inside the animal's reticulum. The components of the transponder are encoded in a cylindrical tube of hard, clear plastics material.

ZA 8,303,599-A discloses an identification system for animals with primary and secondary stomachs which uses a radio transmitter located in the primary stomach and which is coded to identify the animal. The transmitter housing may be an inert plastics material.

The foregoing "bolus" identification systems require the presence of a suitable interrogation unit in order to identify an animal. There is therefore a problem in identifying an animal if death or slaughter takes place in circumstances when no interrogation unit is available, for example on a farm, during transit or on occasions when an interrogation unit may be inoperative for some reason. There may also be a problem if the electronic identification device malfunctions or becomes inoperative during a long period of residence of the bolus in an animal's stomach. When an electronic identification device encodes a particular identification code, it has an electronic state which is different from that of any other device encoding a different identification code. If no interrogation unit is available, there is no means of indicating the electronic state of the device. Likewise if the identification device malfunctions or becomes inoperative, there is no means of indicating the former electronic state of the device. This is a different problem than would be encountered with an ear tag which is accessible and available for inspection throughout the animal's life and which can be readily replaced if necessary. It is also desirable that an identification code held in the electronic device should also be readily useable in record systems relating to the animal, either computer systems or "hard copy" systems such as record cards, health certificates and the like.

While electronic animal identification systems are particularly intended for use in control of animal diseases and/or for herd management, they do not however themselves provide any indication of animals which are suffering from disease or which are in a particular physical condition, such as the onset of oestrus.

To this end, it has been proposed to monitor body temperature changes in cows by measuring the temperature of milk as it comes from the cow. However this technique has disadvantages e.g. the temperature readings are subject to external influences, there is a lengthy interval between milkings, and a difficulty of comparison with previous readings.

Joseph Pfistershammer of C.I.C. Enterprises P/L, Perth, Western Australia, has proposed a removable intra-vaginal thermosensing device to monitor the variations of a cow's body heat, particularly for oestrus detection. Electronic data gathered by the monitor in the vaginal insert is relayed to a stationary receiver at least once in every 24 hours and software in the controlling unit is programmed to interpret the information, distinguishing between normal and abnormal temperature variations, including those that indicate the onset of a disease or a likely pregnancy. However Pfistershammer only suggests retention of the electronic device within the vagina for some 3 months.

EP 0,395,188 NEDAP describes a probe comprising a digital code circuit in which an identification code is stored, as well as a substantially digital measuring circuit connected to a temperature sensor element.

It is a further object of the present invention to provide a system for monitoring body temperature for substantially the whole life of an animal.

DISCLOSURE OF INVENTION

In a first aspect, the present invention provides a bolus for oral administration to a ruminant animal and for retention in the rumen or reticulum of the animal, the bolus having an electronic identification device housed therein with an identification code encoded in the electronic device, characterised by a permanent visual representation of the said identification code on and/or within the bolus. The visual representation of the identification code on a particular bolus provides a visual indication of the electronic state of the identification device in that individual bolus. With the system of the present invention, the bolus may be removed from the animal at or after death and the identification code may be determined from the visual representation even if an electronic interrogation unit is not available or if the electronic identification device is no longer functioning. Thus the permanent visual representation of the identification code contributes significantly to the technical function of the bolus and provides an advantageous safeguard which increases the utility of a bolus identification system.

The term "bolus" as used herein refers to a body which can be administered orally to a ruminant animal; the term is not limited to any particular shape or form of body. The electronic identification device may be an active or passive transponder, as known to those skilled in the art. The word "permanent" as used herein means that the permanent visual representation remains readable after retention in an animal's rumen or reticulum.

Preferably the bolus is also provided with a second visual representation of the identification code which is on the exterior surface of the bolus and which is removable therefrom so that it can be transferred to a "hard-copy" record system before the bolus is administered to the animal. With this embodiment, a reliable and consistent record system, for example on card or paper, which is easily and rapidly readable visually, can be established for all animals carrying the coded bolus.

The visual representation may carry a numeric or alphanumeric representation of the code held electronically in the identification device. More preferably, the visual representation(s) comprise a label carrying a bar code in addition to a numeric representation of the code. Bar code readers are usually substantially cheaper, lighter and more widespread than the electronic interrogation units required to determine the electronic code in a transponder.

In the preferred embodiment, the permanent visual representation is protected by an outside portion of the bolus. More particularly, in the preferred embodiment the bolus comprises an outer shell which is at least partly of transparent material through which the permanent visual representation can be read by eye or (in the case of a bar code) by a bar code scanner. The outer shell is of material which is resistant to attack by contents of the animal's stomach, preferably glass or a transparent plastics material. If the outer shell is of a plastics material which may be permeable to moisture during a long period of retention in the animal's stomach, it is desirable to encapsulate the electronic identification device in a sealed glass capsule which may suitably form the exterior of the inner core.

Preferably the bolus further comprises an inner core within the outer shell, the inner core comprising a matrix material together with the electronic identification device, the specific gravity of the bolus being adjustable by varying the thickness of the outer shell and/or the composition of the matrix material. Most preferably the inner core carries the permanent visual representation of the identification code.

The matrix material suitably comprises a material of high specific gravity such as glass beads and/or barium sulphate, optionally with a binder which may be a plastics material such as epoxy resin. Glass beads are preferred because of their high specific gravity, non-interference with transmission to and from the electronic device, and their resistance to heat (which is important during heat sealing processes).

If desired, the bolus may have added features to provide protection against impact damage which might occur before administration of the bolus e.g. if the bolus is dropped on a hard surface. For example a cushion or cushions, suitably of foam plastics material, may be provided between the outer shell and a glass capsule on the inner core. Alternatively a temporary protective casing may be provided around the glass shell or capsule, the casing suitably being of biodegradable material which will dissolve or otherwise disintegrate inside the animal's stomach. The casing may be of wax (such as the food-grade wax used for coating large cheeses), of gelatine or of a paper-based material, particularly a pulped paper product which may be bonded with a water-soluble adhesive as in "papier mache". In a further alternative, the outer shell may be provided with ribs, preferably longitudinal ribs, to give added strength.

According to another feature of the present invention, the bolus has a transverse cross section which is reduced in one direction as compared to the direction perpendicular thereto, for example an oval or ellipse, particularly a flat-sided ellipse similar to an athletic running track. In this embodiment, the flattened bolus lies on the base of the animal's first or second stomach with the electronic identification device closer to the stomach wall than would be the case for a bolus of round cross section having comparable mass.

In a second aspect, the present invention provides a combined identification and temperature-monitoring system for ruminant animals comprising a bolus adapted to be retained in the animal's rumen or reticulum and having an electronic identification device housed therein, wherein the bolus also houses a temperature sensor and an electronic device for transmitting data from the temperature sensor in response to an interrogation unit outside the animal.

Preferably the identification device and the temperature monitoring device utilize a common transmitter within the bolus and are scannable by a common interrogation unit. Most preferably the identification code and the temperature data are readable in a single numeric or alphanumeric representation, with the temperature data before or after the identification code.

In the preferred embodiment of the invention in this aspect, the temperature sensor is a thermistor. However other temperature sensors such as thermocouples or platinum resistance thermometers may also be used. Preferably the temperature monitoring device is externally powered by the interrogation unit e.g. the electronic device may incorporate a cell which is energised periodically by a scanner. However if necessary or desirable a battery such as a lithium battery or other long life battery may be housed within the bolus to power the system.

The invention also encompasses an identification system combining the first and second aspects of the invention as identified above, as well as an identification system according to the first aspect comprising one or more of the features of the second aspect and an identification system according to the second aspect comprising one or more of the features of the first aspect.

BRIEF DESCRIPTION OF DRAWINGS

Several embodiments of the invention are illustrated in the accompanying drawings, in which:

FIG. 3 is a longitudinal cross section of the bolus of FIG. 2;

FIG. 4 is a transverse cross section of the bolus of FIG. 3;

FIG. 7 is a longitudinal cross section of the bolus of FIG. 6, on the line A—A in FIG. 8;

FIG. 8 is a longitudinal section on the line B—B in FIG. 7;

FIG. 9 is a transverse cross section of the bolus of FIGS. 7 and 8 on the line C—C in FIG. 8;

FIG. 10 is a plan view, partly in cross section, corresponding to FIG. 7 but showing the exterior surface of the inner core;

FIG. 16 is a projection of a bolus according to a seventh embodiment;

FIG. 17 is a transverse cross section on the centre line of the shell of the bolus of FIG. 16.

MODES FOR CARRYING OUT THE INVENTION

Figure 1:
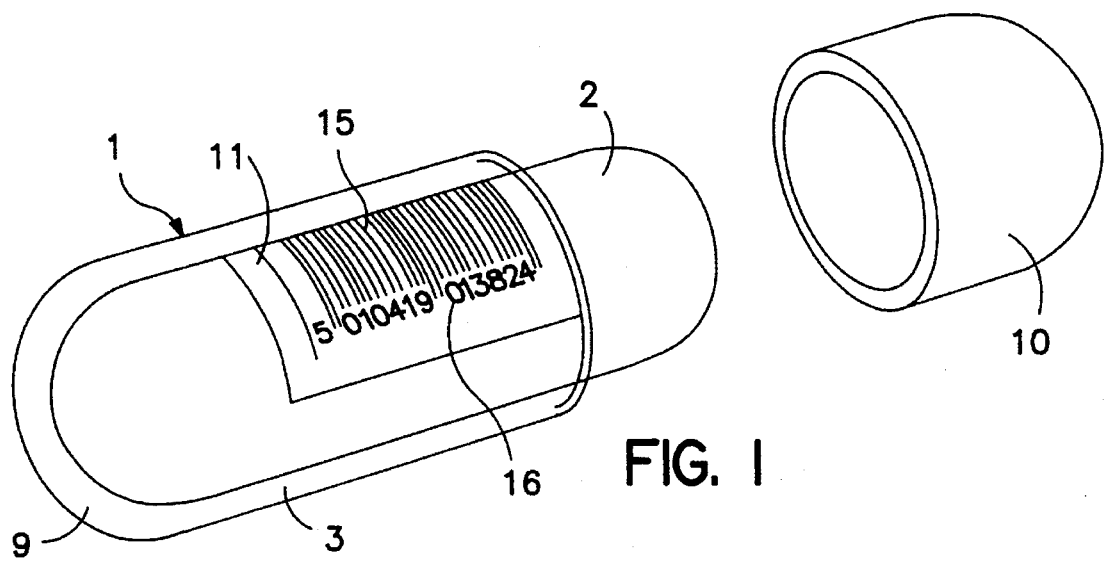
FIG. 1 is a projection of a cylindrical bolus prior to the final stage of assembly.
Figure 2:
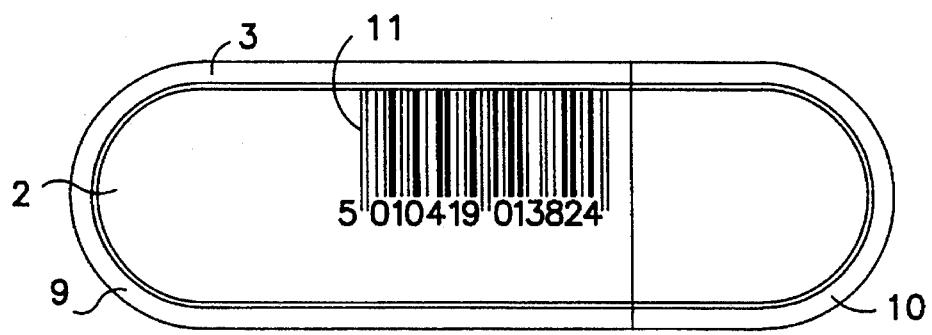
FIG. 2 is a plan view of the assembled bolus of FIG. 1.
Figure 5:
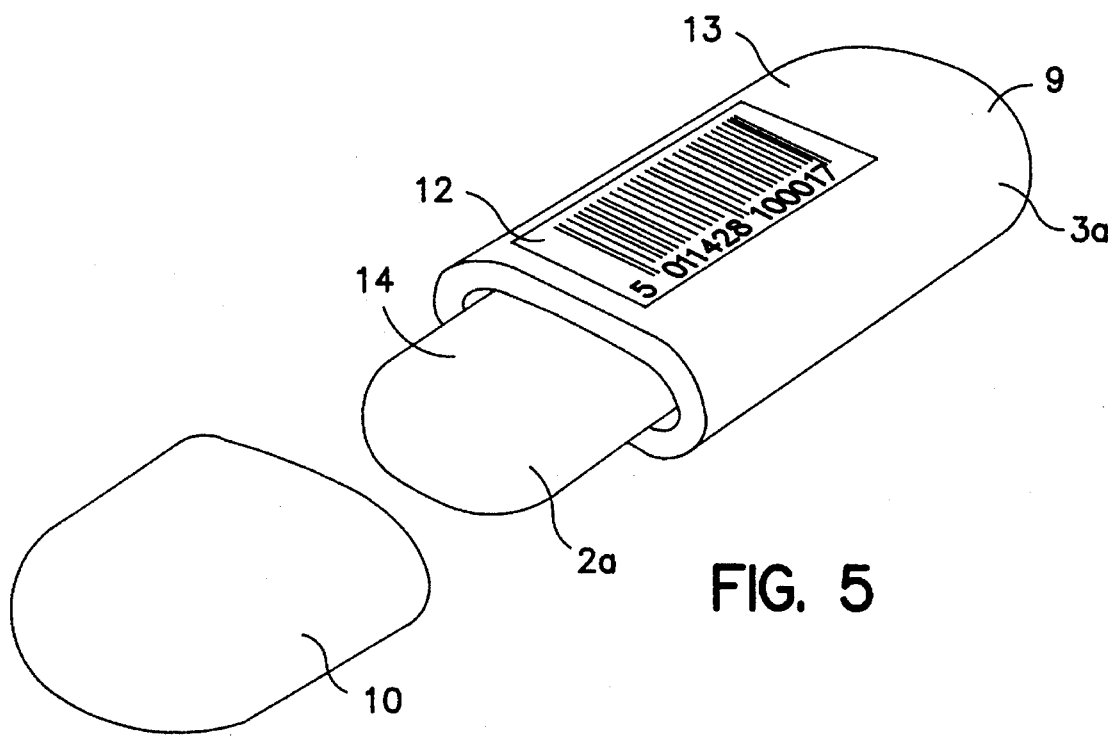
FIG. 5 is a projection of a flattened bolus prior to the final stage of assembly.
Figure 6:
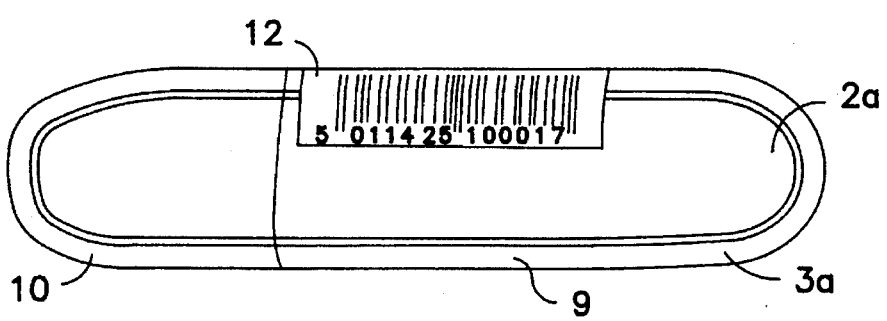
FIG. 6 is a view from above and one side of the assembled bolus of FIG. 5.

As shown in FIGS. 1–4, an identification system according to the invention comprises a bolus 1 having a size and specific gravity suitable to ensure that it is not regurgitated from the animal's rumen or reticulum but is retained therein for the life of the animal. The bolus suitably has a size and specific gravity similar to that of the known type of bolus which is used to administer growth promoters and the like to cattle. A length of 75–110 mm (preferably about 75 to about 85 mm) and a diameter of 15–35 mm (preferably about 18 to about 22 mm) with a specific gravity of at least 1.75 and preferably about 2 or greater can be used for cattle. A smaller size will be appropriate for sheep, e.g. a length of about 55 to about 75 mm and diameter of about 18 to 22 mm. The bolus can be administered orally using a known type of balling gun.

The bolus 1 comprises an inner core 2 and an outer shell 3. The inner core comprises plastics material surrounding an electronic transponder 4, which may conveniently be a cylindrical transponder with a diameter in the range 2–5 mm and a length in the range 15–35 mm. Such transponders are commercially available from NEDAP N.V. of NL-7140 Groenlo, The Netherlands. The transponder comprises a microchip code circuit 5, and a coil 6 wound on a ferrite rod, all housed within a glass tube 8.

The outer shell comprises a glass housing in two parts 9, 10. The housing is annular in transverse cross section and is generally cylindrical with hemispherical or conical ends.

The inner core has an exterior shape similar to that of the outer shell and has external dimensions marginally smaller than the internal dimensions of the outer shell.

A permanent visual representation 11 of an identification code is carried on the external surface of the inner core 2, inside the outer shell 3. The visual representation comprises a bar code 15 and a numeric code 16 corresponding thereto. Both codes correspond to the identification code encoded in the transponder. As shown in the drawings, the visual representation 11 comprises an adhesive label which is applied to the surface of the inner core. Sufficient space is allowed between the core and shell to accommodate the label 11. Alternatively the visual representation may be printed directly into the exterior surface of the inner core, for example by ink jet printing.

A second visual representation of the code is provided by a peelable label 12 applied to the exterior surface of the outer shell 3. This label 12 carries the same identification code as the permanent visual representation 11 and the transponder 4. The peelable label 12 is removable from the bolus and applicable to a record document or the like before the bolus is administered to an animal. More than one removable label 12 can be carried on the outer shell 3 if required.

The specific gravity of the bolus can be adjusted by varying the thickness of the glass outer shell 3 and/or the composition of the plastics matrix of the inner core 2. A food-grade transparent plastics material could alternatively be used for the outer shell, with the specific gravity of the core being increased in compensation.

Inner cores 2 can be manufactured in advance by moulding or casting suitable plastics material around a transponder, without exceeding the heat tolerance of the responder. Alternatively the core may be manufactured with a cavity to receive the transponder which may be inserted subsequently. For example, the core may be manufactured in 2 parts which can be assembled after insertion of the transponder into the cavity. Exemplary plastics materials for the core include epoxy resin, flexible p.v.c., polyethylene and polyethylene terephthalate. Each individual transponder is programmed electronically with a unique identification number either before or after manufacture of the core 2. At the same time, or subsequently by scanning the transponder to ascertain its code, the labels 11, 12 are prepared with the bar code and number corresponding to the electronic code. One label 11 is applied to the core 2 and the other label 12 is applied to the shell 3. The core 2 is then inserted into one part 9 of the glass shell, the second part 10 is slid up against the first part, and the two parts of the shell are sealed together.

The permanent label 11 is readable through the glass shell (see FIG. 2) but is protected therein against attack by digestive juices etc.

FIGS. 5–10 show a second embodiment of the invention which is generally similar to the first embodiment and similar reference numerals are used. However in this embodiment the bolus is not cylindrical but has a flattened configuration so that, as seen in FIG. 9, one transverse dimension is substantially reduced as compared to the dimension at right angles to it. The shell 3a and core 2a each have substantially flat faces 13, 14 connected by rounded edges. The thickness of the core 2a between the flat faces 14 is only slightly greater than the diameter of the transponder 4, so that a minimum of matrix material is present between the transponder and face 14.

The bolus of this embodiment is designed to lie with one of its flat faces 13 on the base of the rumen or reticulum of the animal. This minimises movement of the bolus in the stomach and locates the transponder 4 closely against the stomach wall so the electronic reading of the identification code through the stomach wall is facilitated. The labels 11, 12 can be applied to the flat faces 14, 13 which may improve their readability as compared to labels applied to cylindrical faces as in the embodiment of FIG. 1.

If desired, an externally visible mark such as a triangular punched hole in the animal's ear can be used to indicate an animal to which a bolus has been administered. Alternatively an ear tag such as described in our International Patent Application WO 91/10982 may be used.

Figure 11:
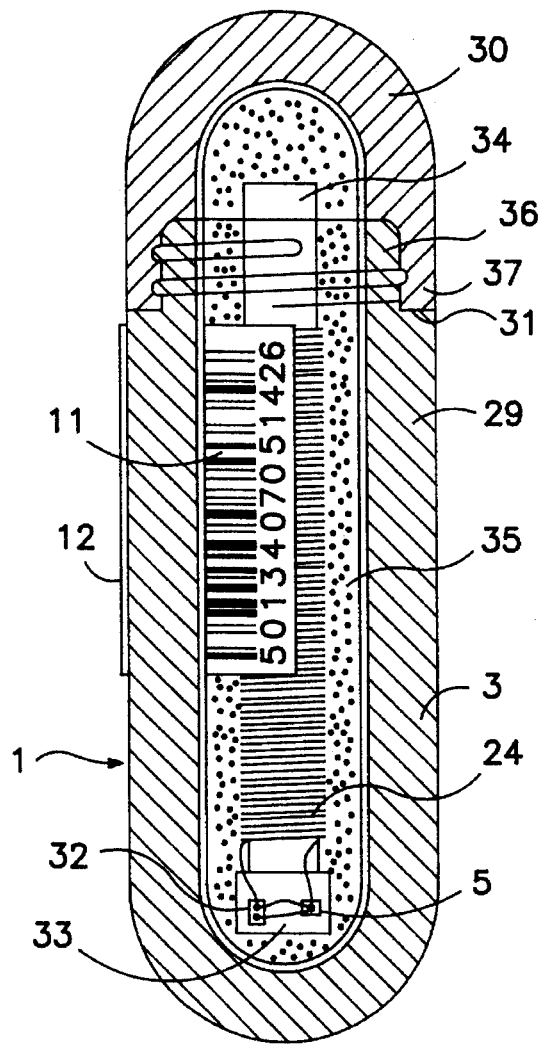
FIG. 11 is a longitudinal cross section of a bolus according to one embodiment of the invention in its second aspect.
Figure 12:
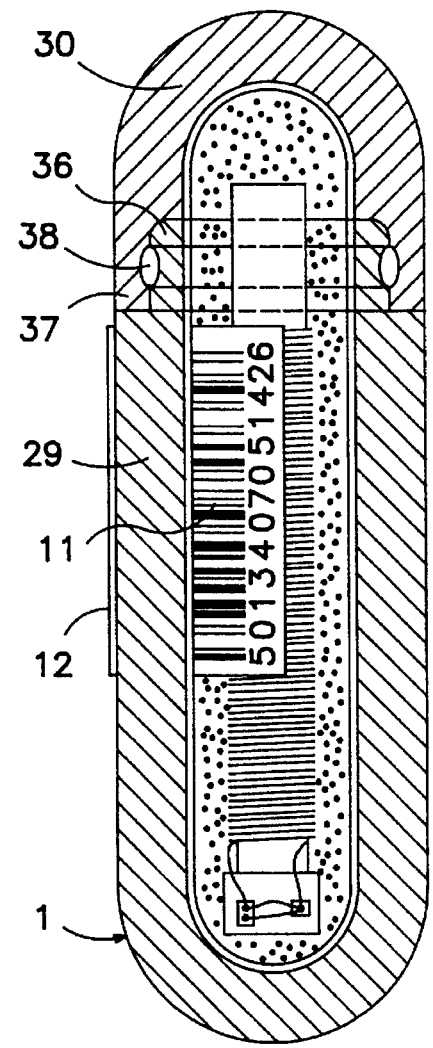
FIG. 12 is a similar view of another embodiment of the invention in its second aspect.

Referring now to FIGS. 11 and 12, as shown in the drawings, the bolus 1 has an outer shell 3 made of glass, in two parts 29 and 30 or in one part where the aperture used to insert the electronic chip, coil and ferrite core is heat sealed at one end. The main part 29 forms one end and most of the cylindrical shell of the bolus. The second part 30 forms a cap at the other end and a portion of the cylindrical shell, meeting the main part 29 at a junction 31 which does not significantly interrupt the smooth external surface of the shell.

Housed within the shell is an electronic device 24 which is an adaptation of a commercially available type of transponder as already described above. The device comprises a microchip code circuit 5 for the identification code and a thermistor microchip 32 for temperature monitoring, both mounted on a card 33, together with a coil 6 of copper wire wound on a ferrite rod 34. The components may suitably be housed within a glass tube, such as the tube 8 shown in FIG. 3.

The electronic device 24 is held in a matrix 35 of plastics material, such as epoxy resin, which may if desired be filled with a filler such as glass beads to increase the specific gravity of the bolus to the preferred level of 2 or greater. The matrix 35 may be preformed as an inner core 2, as already described above, or it may be cast in situ inside the glass shell 3. For example, the electronic device may be suspended inside the main part 29 of the shell and the matrix may then be cast around it. The cap part 30 of the shell may be held in inverted position, so that it is open upwardly, and filled with the plastics matrix material in liquid condition, after which the main part 29 with the cured matrix and electronic device held in it may be brought down onto the cap part to close the shell, after which the liquid plastics material is cured inside the cap part 30.

The label 11 bearing the permanent representation of the identification code is applied to the core 2 as previously described with reference to FIGS. 1–4. Alternatively, if the matrix is cast in situ inside the glass shell 3, the label 11 may be inserted into the shell and pressed against the interior surface of the shell before the matrix material is supplied to the shell.

A peelable label 12 is applied to the exterior of the shell 3 as already described with reference to FIGS. 1–4.

In the device previously described above, it was possible to seal the two parts of the glass shell by heating the glass at the junction to a molten condition. However such heat treatment could damage the temperature sensor of the present application. Localised heating, optionally combined with a heat shield between the junction and the temperature sensor, may be used to seal the two parts of the shell. Alternatively, sonic welding may be used.

However the embodiments shown in FIGS. 11 and 12 of the accompanying drawings can be sealed without the application of heat. FIG. 11 shows an embodiment in which the two shell parts 29 and 30 have a screw threaded connection, the main part 29 having an externally threaded male portion 36 which fits inside an internally threaded female portion 37 on the cap part 30. The junction may be locked by a suitable thread-locking or glass-bonding adhesive (e.g. from Loctite Corporation) which may be cured anaerobically or by exposure to light.

With a mechanical joint, it is possible to use an outer shell of relatively thick toughened glass which is resistant to breakage. For heat sealing, thinner glass is required.

FIG. 12 shows a second embodiment of this aspect of the invention in which the male portion 36 of the main part is not screw-threaded but has a shallow circumferential groove to receive an O-ring gasket 38 of elliptical cross section. The female portion 37 of the cap part has a similar groove in its internal surface. The gasket 38 is of fairly hard resilient plastics material. The leading edge of the female portion 37 of the cap part is chamfered on its internal edge in order to ride over the gasket 38 as the two parts are brought together. The base region of the male portion 36 is tapered in a corresponding manner. The gasket in the two facing grooves holds the two parts of the shell together. The seal may be enhanced by a suitable locking or glass-bonding adhesive as described for FIG. 11.

The identification code and body temperature data are transmitted by the electronic device 24 to a suitable scanner and are read by the scanner and optionally recorded by it or by a computer associated therewith. The identification code, which as already shown may have up to 13 digits, is supplemented by 3 or more additional digits indicating the body temperature to 1 or more decimal places e.g. 38.4. Preferably the temperature data appears after the identification code and may be omitted if desired. The thermistor microchip is preferably designed so that temperature data is gathered at regular intervals, e.g. every half hour, and is held in the chip until the next scanning, when all of the data is off loaded to the scanning device. Temperature variations less than 0.2° C. may be ignored so that the data base is not unnecessarily cluttered.

Instead of being in two parts, the outer shell of glass may be in one part and a hole may be provided at one end for insertion of the electronic components, this hole subsequently being heat sealed. Barium sulphate may be used to fill the interior of the shell. The interior need not be entirely filled. The visual representation of the identification code may be carried on the ferrite rod.

It is necessary to have a bolus of small size so that it can conveniently be administered to young calves. An even smaller overall size is necessary for administration to lambs. It is desirable that the ferrite rod and coil should be as large as possible in order to maximise the transmission range, but this reduces the specific gravity of the bolus.

In order to ensure an impermeable housing for the electronic identification device, it is desirable to have the device encapsulated in glass, either by a glass outer shell or by an inner glass capsule. To keep the bolus small enough it is desirable to use glass of relatively thin wall thickness which can be heat sealed but this introduces a risk of breakage of the glass in the event of the bolus being dropped prior to administration to the animal. It is desirable therefore to encase the glass in a protective outer housing of plastics material which forms the outer shell but this has the effect of reducing the specific gravity of the bolus. The preferred way of compensating for the reduction in specific gravity while maintaining the size/transmission ratio within the desired parameters is to fill the cavity within the inner core with material of high specific gravity, particularly glass beads or the like.

Figure 13:
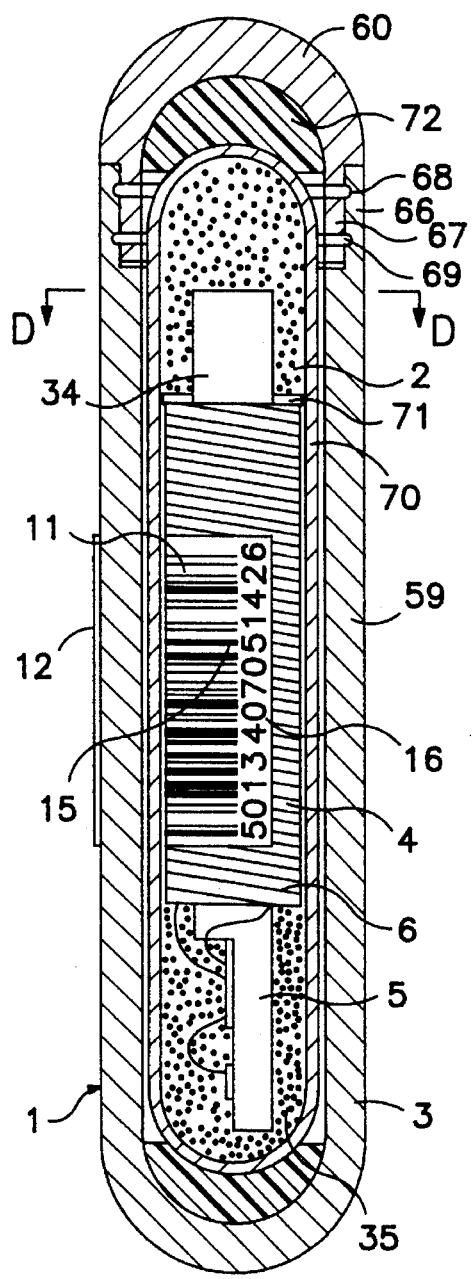
FIG. 13 is a longitudinal cross section of a bolus according to a fifth embodiment.
Figure 14:
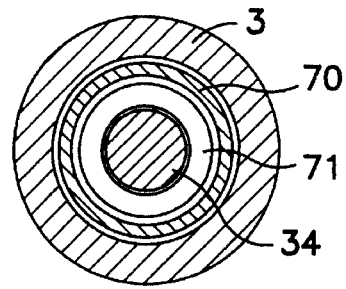
FIG. 14 is a transverse cross section of the bolus of FIG. 13 on the line D—D.

Referring now to FIGS. 13 and 14, the bolus 1 has an outer shell 3 made of hard transparent plastics material which is resistant to attack by acids, for example one of the range of ULTEM (Trade Mark) engineering thermoplastics available from General Electric Plastics Europe based on polyetherimide resins. The shell is in two parts 59 and 60, similar to the parts 29 and 30 in the embodiment of FIGS. 11 and 12. The main part 59 has a skirt 66 with a pair of grooves 68 in its internal surface. The cap part 60 has a sleeve 67 which fits inside the skirt 66 and which bears circumferential ribs 69 on its external surface. The ribs 69 provide a snap-fit engagement with the grooves 68 to hold the two parts of the shell together. The seal may be enhanced by a suitable adhesive or by sonic welding, if desired.

The core 2 comprises a thin glass capsule 70 (e.g. with a wall thickness of about 2 to about 2.5 mm) which encloses the transponder 4 comprising a microchip code circuit 5, coil 6 and ferrite rod 34. The coil is of increased diameter relative to the diameter of the bolus (as compared to the previous embodiments) in order to increase the transmission range of the transponder. A label 11 bearing the visual representation of the identification code as both a bar code 15 and a number 16 is adhered to the outer surface of the coil so as to be visible through the glass capsule 70 and the plastics shell 3. Peelable label 12 is applied to the surface of the shell 3.

The space inside the glass capsule not occupied by the transponder is filled with a matrix 35 which suitably comprises glass beads and/or barium sulphate powder with or without a plastics material such as an epoxy resin. The proportions of glass beads or barium sulphate to resin may be adjusted to regulate the specific gravity of the bolus as a whole at approximately 2. It has been found that the presence of barium sulphate adjacent to the transponder has no noticeable effect on its transmission range.

At the end of the coil 6 remote from the chip 5 there is an annular metal washer 71 surrounding the rod 34. The washer 71 provides a heat shield to protect the coil and chip from the effects of heat treatments at the cap end of the bolus.

The glass capsule 70 may be made in two parts like the glass shell 3 in the embodiment of FIG. 1 and may then be united by heat sealing. Alternatively the capsule may be made as a tube which is open at one end and which is sealed at its open end after the contents have been inserted. Most suitably the sealing is effected by heat which renders the glass molten so that it flows to close over the opening.

As shown in FIG. 13, a pair of resilient plastics foam cushions 72 are provided at the ends of the bolus, between the shell 3 and the core 2. These cushions are to protect the ends of the glass capsule 70 from possible impact damage in the event of the bolus being dropped on a hard surface.

Figure 15:
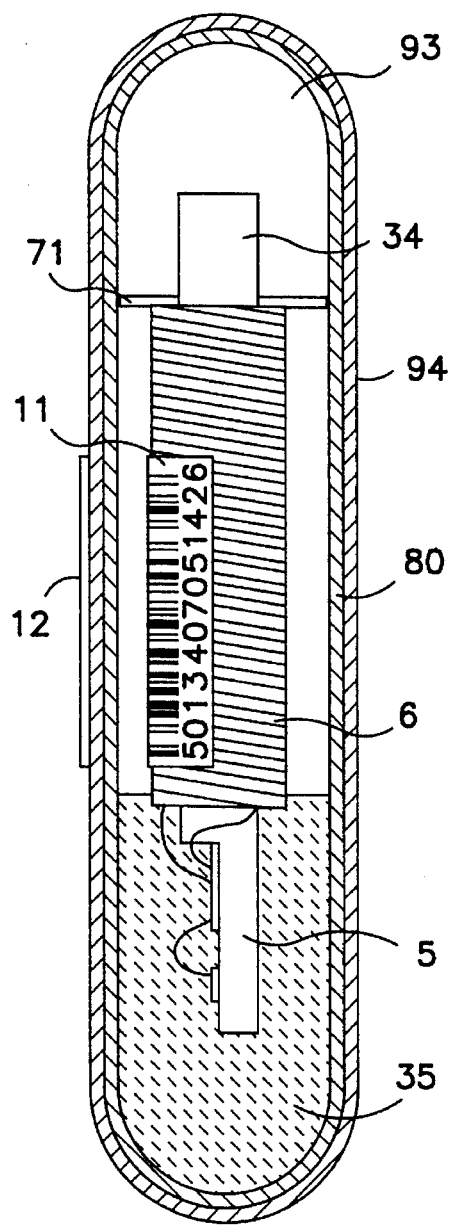
FIG. 15 is a longitudinal cross section of a bolus according to a sixth embodiment.

In the sixth embodiment shown in FIG. 15, the shell comprises a thin glass capsule 80 similar to the capsule 70 described with reference to FIGS. 13 and 14. The coil 6, chip 5 and ferrite rod 34 are housed inside the capsule 80, with the label 11 applied to the coil 6. A heat shield 71 is also provided.

The interior of the capsule is partly filled (at the end where the chip is located) with a heavy matrix material 35 such as glass beads and/or barium sulphate optionally mixed with epoxy resin. However the remainder of the interior of the capsule surrounding the coil and the ferrite core is left unfilled to provide an air space 93. As this embodiment does not have an outer shell of plastics material, the specific gravity is relatively high.

The capsule 80 is surrounded by a temporary protective outer casing 94 of biodegradable material which may suitably be of wax, gelatine or "papier mache". This outer casing 94 protects the glass capsule 80 from potential damage if it is dropped on a hard surface or otherwise suffers impact before it is administered to an animal. The casing also retains broken glass in the event that the capsule is accidentally broken. The peelable label 12 is carried on the outer casing 94. After insertion into the animal's rumen or reticulum, the outer casing 94 disintegrates. When the bolus is subsequently recovered from the animal, the visual representation of the code on the label 11 can be read through the glass capsule 80.

FIG. 16 shows a seventh embodiment which is similar to that of FIGS. 13 and 14 but the shell 3 is provided with longitudinal ribs 114 on its exterior surface. The ribs provide strength so that the wall thickness of the shell in the areas 115 between the ribs can be minimised, thus economising on material and creating strength without mass and without decreasing the specific gravity of the bolus. The shell 3 can be injection moulded in two parts like those of FIGS. 11–14 and the two parts can be heat sealed or sonically welded together. Alternatively the shell 3 can be made from a length of extruded ribbed tube which is heat sealed at both ends to enclose the core therein. The tube may be heat-shrunk onto the core (not shown in FIG. 17).

Any of the embodiments described above can be modified by providing a permanent visual representation of the identification code, suitably in the form of a number, etched or engraved on the outer shell of the bolus, instead of or in addition to the permanent visual representation inside the shell. However it is preferred to have the permanent visual representation protected by an outside portion of the bolus so that it is not exposed to possible tampering by unscrupulous persons or to possible degradation by the contents of the animal's stomach.

INDUSTRIAL APPLICABILITY

The present invention provides an integrated identification and record keeping system for ruminant animals which can be used throughout the life of the animal. The identification code held in the bolus inside the animal's stomach can be read externally at any time by use of an electronic interrogation unit. After death or slaughter, the bolus can be located much more easily than an implanted transponder so that the identification device can be recovered in an orderly and rapid manner. In the unlikely event that the bolus is not recovered, neither it nor any residue of it will enter the food chain because an animal's stomach is treated as offal. If no electronic identification unit is available after recovery of the bolus at the time of death or slaughter (or before administration of the bolus), the identification code on the permanent visual representation 11 can be read by eye, by bar code scanner or by optical character reader scanning the numerals. Similar reading means can be used at any time to check the other label 12 on a record document and to compare its code with the code in or on the bolus and/or the code held in a computer which provides the central monitoring and record keeping system concerning animal disease, animal subsidy payments, animal movements across borders and the like. The code can incorporate all required information such as country, region and herd of origin and details of the animal's breeding, so that it can be easily traced. After removal of the bolus from an animal, the bar code in visual representation 11 can be read by a scanner/printer unit which prints out additional labels bearing the same bar code. If the carcase is to be examined for disease, these additional labels can be applied to organs or other parts of the carcase which are removed for testing. Data from the tests can then easily be co-ordinated and fed to a computer.

In the embodiments of FIGS. 11 and 12 the present application provides an integrated system for identifying ruminant animals such as cows and also for monitoring changes in the body temperature of individual animals throughout substantially the whole of the life of the animal. Scanners may be hand held or may be mounted at automatic feed dispensers, calf feeding machines, milking parlours, stock handling facilities, research stations, etc. When an animal passes a scanner the identification code and all temperature changes recorded since the last scanning are offloaded. The scanner may record all animal identification numbers so that (after milking for example) missing animals can be detected. The scanner may give immediate audio and/or visual warning of any significant temperature changes so that the operator can identify and/or isolate the affected animal. The scanner may have a printout as well as a visual display unit to show all temperature variations since the previous scanning. Software in the controlling unit may be programmed to interpret the information e.g. to indicate the onset of oestrus or a disease which affects body temperature.

The temperature data can, if desired, be held in a central computer as described above.

We claim:

1. A bolus for oral administration to a ruminant animal and for retention in the rumen or reticulum of the animal, the bolus having an electronic identification device housed therein with an identification code encoded in the electronic device, characterized by a permanent visual representation of the said identification code on the bolus.

2. A bolus according to claim 1 characterized by a second visual representation of the said identification code, the second visual representation being on the exterior surface of the bolus and being removable therefrom so that it can be transferred to a record system before the bolus is administered to an animal.

3. A bolus according to claim 1 characterized in that the permanent visual representation comprises a label carrying a bar code in addition to a numeric representation of the code.

4. A bolus according to claim 1 characterised in that the permanent visual representation is protected by an outside portion of the bolus.

5. A bolus according to claim 4, characterised by an outer shell which is at least partly of transparent material through which the permanent visual representation is readable.

6. A bolus according to claim 5 characterized by an inner core within the outer shell, the inner core comprising a matrix material together with the electronic identification device, the specific gravity of the bolus being adjustable by varying the thickness of the outer shell.

7. A bolus according to claim 6, wherein the matrix material includes glass beads to increase the specific gravity of the bolus.

8. A bolus according to claim 5 wherein the outer shell comprises glass.

9. A bolus according to claim 5 characterized by an inner core within the outer shell, the inner core comprising a matrix material together with the electronic identification device, the specific gravity of the bolus being adjustable by varying the composition of the matrix material.

10. A bolus according to claim 5 wherein the outer shell comprises transparent plastics material.

11. A bolus according to claim 1, characterized in that it also houses a temperature sensor and an electronic device for transmitting data from the temperature sensor in response to an interrogation unit outside the animal.

12. A bolus according to claim 11 characterised in that the identification code and the temperature data are readable in a single numeric or alphanumeric representation, with the temperature data before or after the identification code.

13. A bolus for oral administration to a ruminant animal and for retention in the rumen or reticulum of the animal, the bolus having an electronic identification device housed therein with an identification code encoded in the electronic device, characterized by a permanent visual representation of the said identification code within the bolus.

14. A bolus according to claim 13 characterized by a second visual representation of the said identification code, the second visual representation being on the exterior surface of the bolus and being removable therefrom so that it can be transferred to a record system before the bolus is administered to an animal.

15. A bolus according to claim 13 characterized in that the permanent visual representation comprises a label carrying a bar code in addition to a numeric representation of the code.

16. A bolus according to claim 13 characterized in that the permanent visual representation is protected by an outside portion of the bolus.

17. A bolus according to claim 16, characterized by an outer shell which is at least partly of transparent material through which the permanent visual representation is readable.

18. A bolus according to claim 17 characterized by an inner core within the outer shell, the inner core comprising a matrix material together with the electronic identification device, the specific gravity of the bolus being adjustable by varying the thickness of the outer shell.

19. A bolus according to claim 18, wherein the matrix material includes glass beads to increase the specific gravity of the bolus.

20. A bolus according to claim 19 characterized in that the identification code and the temperature data are readable in a single numeric or alphanumeric representation, with the temperature data before or after the identification code.

21. A bolus according to claim 17 characterized by an inner core within the outer shell, the inner core comprising a matrix material together with the electronic identification device, the specific gravity of the bolus being adjustable by varying the composition of the matrix material.

22. A bolus according to claim 17 wherein the outer shell comprises glass.

23. A bolus according to claim 17 wherein the outer shell comprises a transparent plastics material.

24. A bolus according to claim 13, characterized in that it also houses a temperature sensor and an electronic device for transmitting data from the temperature sensor in response to an interrogation unit outside the animal.

* * * * *